(12) United States Patent
Ward et al.

(10) Patent No.: US 10,268,428 B2
(45) Date of Patent: Apr. 23, 2019

(54) MEDIUM PROMPTING MECHANISM

(71) Applicants: David Ward, Broomfield, CO (US); John Varga, Longmont, CO (US)

(72) Inventors: David Ward, Broomfield, CO (US); John Varga, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 63 days.

(21) Appl. No.: 14/629,702

(22) Filed: Feb. 24, 2015

(65) Prior Publication Data

US 2016/0247053 A1  Aug. 25, 2016

(51) Int. Cl.
*G06F 3/12* (2006.01)
*G06K 15/00* (2006.01)
*G06K 15/02* (2006.01)

(52) U.S. Cl.
CPC .......... *G06F 3/1253* (2013.01); *G06F 3/1205* (2013.01); *G06K 15/002* (2013.01); *G06K 15/1809* (2013.01)

(58) Field of Classification Search
CPC .. G06K 15/4065; G06F 3/1205; G06F 3/1253
USPC ....................................................... 358/1.15
See application file for complete search history.

(56) References Cited

U.S. PATENT DOCUMENTS

| | | | |
|---|---|---|---|
| 6,327,050 B1 | 12/2001 | Motamed et al. | |
| 7,242,487 B2 * | 7/2007 | Lucivero | B41B 19/00 358/1.13 |
| 7,251,047 B2 | 7/2007 | Meade, II | |
| 7,283,258 B1 * | 10/2007 | Kuno | B41J 2/17566 358/1.13 |
| 8,363,237 B1 | 1/2013 | Withington et al. | |
| 8,498,000 B1 * | 7/2013 | Komazawa | G06F 3/1215 358/1.13 |
| 8,711,386 B2 * | 4/2014 | Johnson | G06K 15/186 358/1.13 |
| 8,767,264 B2 | 7/2014 | Kakutani et al. | |
| 2009/0135442 A1 | 5/2009 | Taylor et al. | |
| 2013/0222819 A1 | 8/2013 | Johnson et al. | |
| 2014/0132983 A1 * | 5/2014 | Sponable | G03G 15/5016 358/1.15 |
| 2014/0285846 A1 | 9/2014 | Kiuchi et al. | |

* cited by examiner

*Primary Examiner* — Neil R McLean
*Assistant Examiner* — Darryl V Dottin
(74) *Attorney, Agent, or Firm* — Jaffery Watson Mendonsa & Hamilton LLC

(57) ABSTRACT

A method is disclosed. The method includes receiving a request for paper properties needed to perform page raster image processing (RIP) of a page and prompting an operator to load a virtual paper without inserting a physical medium.

20 Claims, 4 Drawing Sheets

MEDIUM PROMPTING MECHANISM

FIELD OF THE INVENTION

The invention relates to the field of printing systems, and in particular, to processing print jobs at a printing system.

BACKGROUND

In the field of printing, users prefer systems that allow for flexible processing of print jobs, which typically comprise print data received in the form of a page description language (PDL). A PDL data stream typically includes attributes that assist in defining processing steps that may be performed for the print job. Some PDLs select media (e.g., paper) via a list of attributes (e.g., the Big 5). The Big 5 typically includes size (height and width), weight, type, and color. When searching the Big 5, printer trays are sensed for a matching medium paper. However, since some printers have a limited number of trays, a limited number of available papers can be loaded at any given time. Further, jobs may require more papers than the number of available trays at the printer.

Printers typically need the paper information in two separate phases (e.g., during raster image processing (RIP) of the job and when the job is printed). In the RIP phase, the paper properties are used to compose the information needed to print each sheet of the job. A sheet is placed in the sheet queue once a RIP of the sheet is complete. Subsequently, each sheet is printed on the proper paper during the printing phase.

If the actual paper is not loaded into a tray, the print engine must prompt an operator to load that paper into a particular tray and with a particular orientation such that the data from the RIP phase can be used to print. Thus, the operator must be prompted for paper properties when the properties are not known (e.g., a heretofore unused paper type or paper that is not already described in the media catalog) in order to RIP a job for printing.

Currently there are no custom paper types in manual media. However, the user may modify the properties by choosing different printer profiles when loading new paper. This is typically done by placing the new paper into an input tray and selecting pertinent properties in a User Interface (UI). In such an instance, the print engine must be prevented from moving onward so that the paper can be edited. The printer may be printing a previous job during the RIP process for a current job. Thus, loading paper interrupts the printing of the previous job when the printing job requires all of the available input trays (or more).

A UI prompt requests that the operator load paper for the RIP phase by waiting for the print engine to go to a stop condition in the print process (e.g., by stacking all of sheets on the a queue), and then requests that the operator again replace paper to continue printing (without actually printing from the requested paper for the RIP phase). Further, once the printing of the job is continued the RIP job may once again ask for the new paper to be loaded, even on the next sheet. The only way around having paper available is to have pre-defined and saved it in a media catalog. However, such an option is not available in a "manual mode" where a media catalog is not available or used.

Accordingly, a mechanism to prompt a medium change for a RIP is desired.

SUMMARY

In one embodiment, a method is disclosed. The method includes receiving a request for paper properties needed to perform page raster image processing (RIP) of a page and prompting an operator to load a virtual paper without inserting a physical medium

BRIEF DESCRIPTION OF THE DRAWINGS

A better understanding of the present invention can be obtained from the following detailed description in conjunction with the following drawings, in which.

DETAILED DESCRIPTION

A medium prompting mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
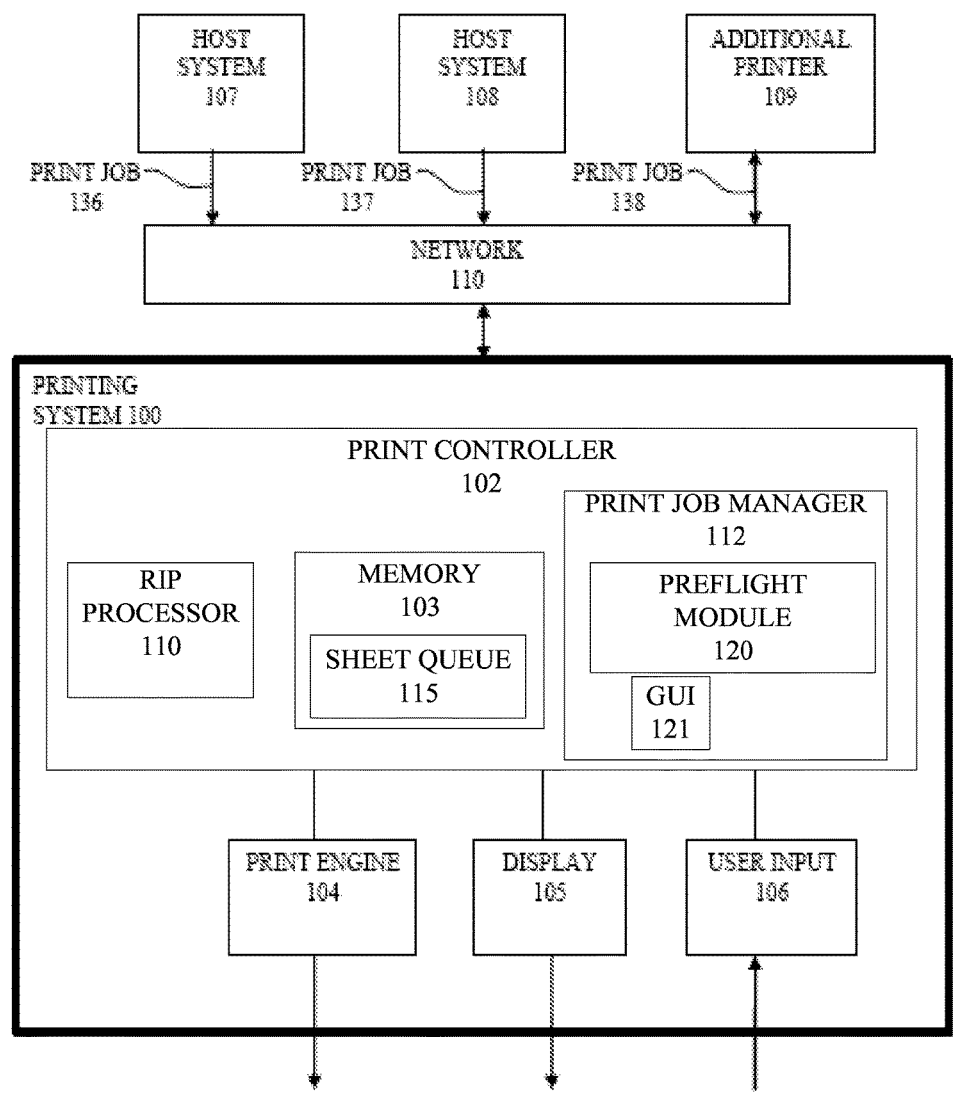
FIG. 1 illustrates one embodiment of a printing system.

FIG. 1 is a block diagram illustrating one embodiment of a printing system 100. Printing system 100 is a system used to provide marks on a media, such as a continuous forms printer or a cut sheet page printer. Printing system 100 may include any digital hardcopy output device, such as printers, copiers, multifunction printers (MFPs) and facsimiles.

In one embodiment, printing system 100 is shared by multiple users. In such an embodiment, printing system 100 includes a print controller 102 and one or more print engines 104. Print controller 102 includes any system, server, or components operable to interface one or more host systems 107 and 108, and a printer 109, via network 110 with one or more print engines 104, and to control the printing of print jobs 136-138 received from the host systems 107 and 108, and a printer 109, respectively, on print engine 104. Print engine 104 provides an imaging process to mark a printable medium, such as paper.

According to one embodiment, print controller 102 includes memory 103, RIP processor 110 and a print job manager 112. Memory 103 includes any storage system operable to store data. RIP processor 110 performs rasterization to convert print data received in the form of a page description language (PDL) to image bitmap data. In one embodiment, print job manager 112 manages the printing of documents at printing system 100. Particularly, print job manager 112 controls print jobs as they wait to print, arranges the priority of the print jobs, generates separator pages and distributes jobs to the destination print engine 104. In one embodiment, print job manager 112 may be implemented using either InfoPrint Manager (IPM) or Info-Print ProcessDirector (IPPD), although other types of print job managers may be used instead.

In one embodiment, print job manager 112 holds received print jobs in memory 103 before processing the print job. In such an embodiment, memory 103 stores the print jobs as either a data file or rasterized bitmap file. For example, print jobs stored as rasterized files reduce print time for the held jobs versus those stored as data files. Once stored, each print job may be held until the user that generated the print job retrieves the corresponding document from printing system 100, at which time the print job is processed and printed.

In a further embodiment, a user may release a selected job for printing at printing system 100 via user input 106. Printing system 100 thereby processes the print job by printing via print engine 104. In still a further embodiment, multiple selected print jobs being held for a particular user may be simultaneously processed and printed at print engine 104. Therefore, all print jobs for the same user are printed together when multiple print jobs are released to print.

Figure 2:
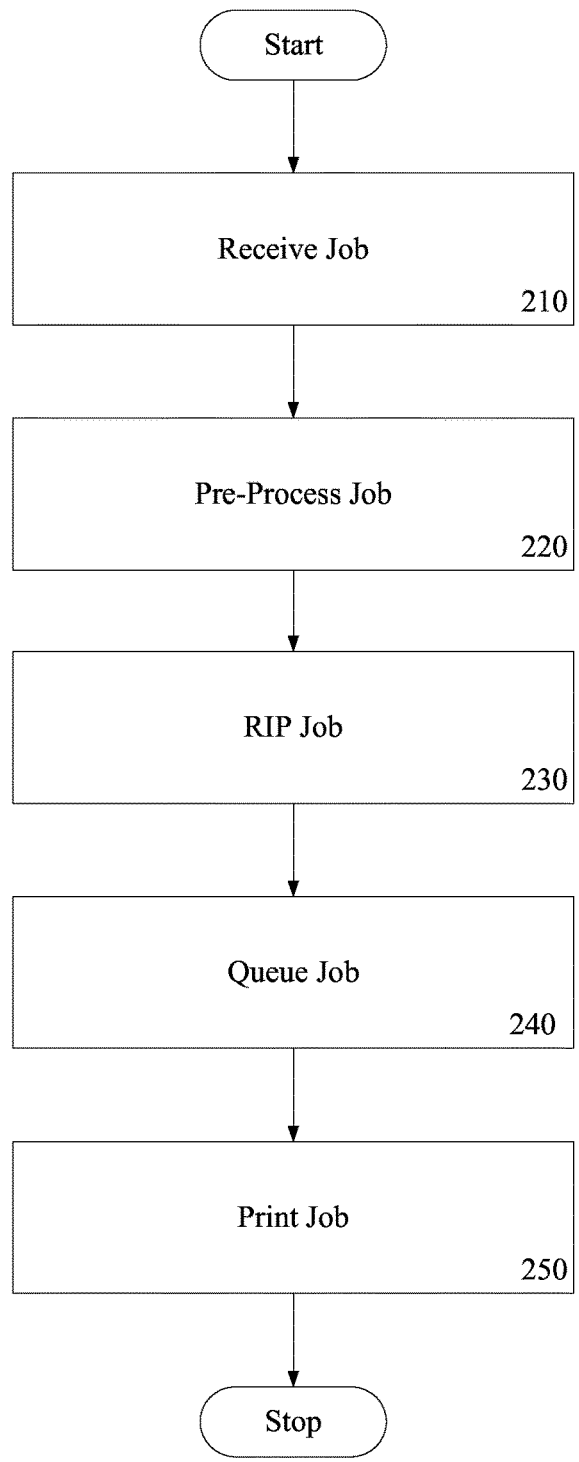
FIG. 2 is a flow diagram illustrating one embodiment of print process.

FIG. 2 is a flow diagram illustrating one embodiment of print processing performed by print controller 102. At processing block 210, print job data is received at print controller 102. At processing block 220, the print job data is pre-processed. In one embodiment, pre-processing includes performing a job preflight, which collects job attributes (e.g., media, finishing, layout, etc.) from the job data stream.

According to one embodiment, print job manager 112 includes a preflight module 120 that is implemented to collect attribute data for the job. Preflight information is useful to decide whether to make a job eligible for printing if all media found during preflight is available in physical printer trays. In addition, the information may be used to predict the time it will take to complete the job after it is submitted for processing.

At processing block 230, the job is processed by performing a RIP of the print job data at RIP processor 110 to generate a rasterized sheet image data. At processing block 240, the sheet data is queued at sheet queue 115 in memory 103. At processing block 250, a physical sheet is produced at print engine 104. Although described in an embodiment as sheets being ripped and then printed, other embodiments may feature an entire job of sheets being ripped and saved at memory 103 for printing at a later time. In yet other embodiment, previously saved, pre-ripped jobs can be released for printing at different times and in different orders.

As discussed above, paper information may be needed at RIP processor 110 during the RIP process in order to compose the information needed to print each sheet of the job. If the paper type for which a RIP is to be performed is not loaded into a tray at system 100, an operator is prompted, via a graphical user interface (GUI), to load the paper. In conventional systems, print engine 104 must be stopped, thus delaying the printing of previously processed jobs.

According to one embodiment, print job manager 112 includes a GUI 121 implemented to prompt a user to provide paper characteristics (or properties) whenever RIP processor 110 requires paper information to continue processing. In such an embodiment, the operator may "virtually" load the paper into a tray to satisfy the request for RIP data without actually inserting paper. The paper is virtually loaded by the operator manually entering, or adjusting paper properties, via GUI 121. In a further embodiment, the virtual paper properties are remembered for the remainder of the job as if a snapshot (e.g., with more trays than in the physical printer). Thus, printing may proceed unimpeded until print engine 104 pulls the sheet from sheet queue 112 and needs the paper loaded.

In another embodiment, print job manager 112 may list media papers based on stored preflight data that can be used as virtual paper. In this embodiment, the list of media may be examined and adjusted by the operator. In other embodiments, the operator can make adjustments (e.g., choose different profiles) even when the media is loaded in a tray.

In a further embodiment, print job manager 112 adjusts the timing of obtaining new paper in order to minimize customer impact if the RIP is in the print path (e.g., job is to RIP and immediately print). Thus, print job manager 112 waits until all previous print jobs are completed and the new paper is needed by print engine 104 for printing before it is loaded. In such an embodiment, replacing paper in a tray to learn the characteristics is held off until an actual paper change is needed by print engine 104.

This interruption occurs because the printing process is to get to another paper not currently loaded. If RIP processor 110 needs a new paper, the interrupted printing may provide that information without an additional interruption. If the job is not RIP-only (e.g., in the print path), the pause naturally occurs when the current jobs or sheets are complete (e.g., similar to synching to the print portion of the processing in the worst case). Jobs that RIP in the print path print at rated speed. Therefore, if RIP processor 110 needs a new paper, and no other paper changes are needed by print engine 104, print engine 104 can wait until sheet queue 112 is empty.

The above-described process is better than swapping paper in the middle of printing since the swap time is then delayed until the paper is actually needed, which removes an extra swap. However, multiple swaps may be made before an unknown paper is needed. In such an instance, print engine 104 becomes idle when print engine 104 is not pausing to switch the content of trays so the new paper is not requested prematurely. In one embodiment, the characteristics are saved (e.g., a virtual snapshot) whenever a paper is loaded to be described so that another request for the same paper is not required again in the job.

Figure 3:
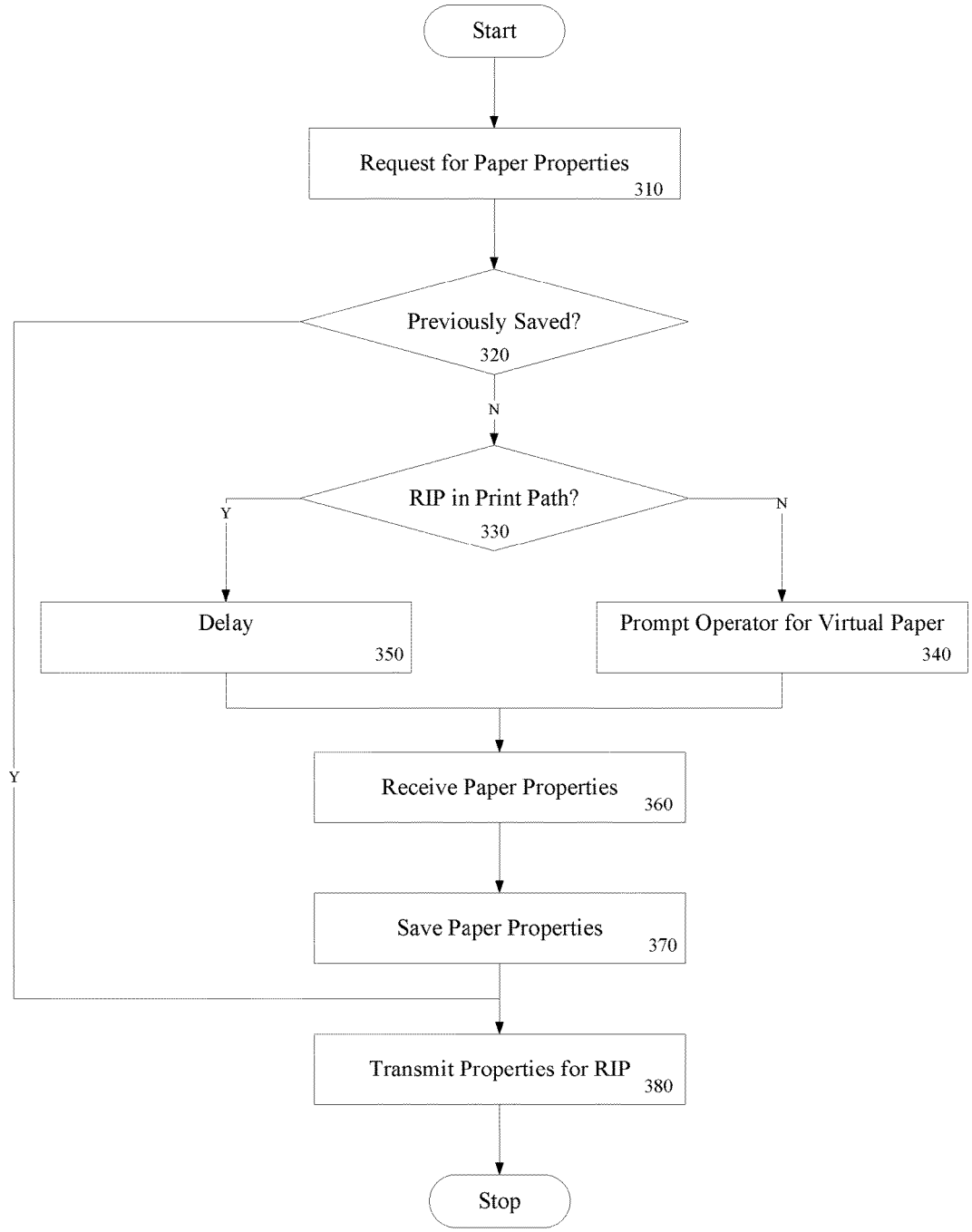
FIG. 3 is a flow diagram illustrating one embodiment of providing medium properties during a RIP process.

FIG. 3 is a flow diagram illustrating one embodiment of providing paper properties for a RIP process. At processing block 310, a request for paper properties needed to continue a page RIP is received from RIP processor 110. In one embodiment, the request is received upon determining that the paper necessary to perform the RIP is not loaded into a tray at printing system 100. At decision block 320, a determination is made as to whether paper properties corresponding to the page has previously been saved. If corresponding paper properties have been saved, the properties are transmitted to RIP 110 for the RIP process, processing block 380.

If paper properties have not previously been saved for the page, a determination is made as to whether the RIP is in the print path, decision block 330. If the RIP is not in the print path, the operator is prompted to virtually load the paper as discussed above, processing block 340. As discussed above, the operator may enter specific properties or select from among various properties obtained during preflight. Once the operator enters the paper properties requisite to virtually load the paper, the properties are received at print job manager 112, processing block 360. At processing block 370, the properties are saved at memory 103. A RIP of the page is then performed, processing block 380.

If at decision block 330 the RIP is determined to be in the print path, print job manager 112 delay timing of obtaining new paper until all previous print jobs are completed and the paper is needed by print engine 104 for printing, processing block 350. At some time later (e.g., all previous print jobs are completed and the paper is needed for printing) the paper is loaded. At processing block 360, the paper properties are received. In one embodiment, the paper properties are received from tray sensor measurements. At processing block 370 the properties are saved. At processing block 380, a RIP of the page is then performed.

Figure 4:
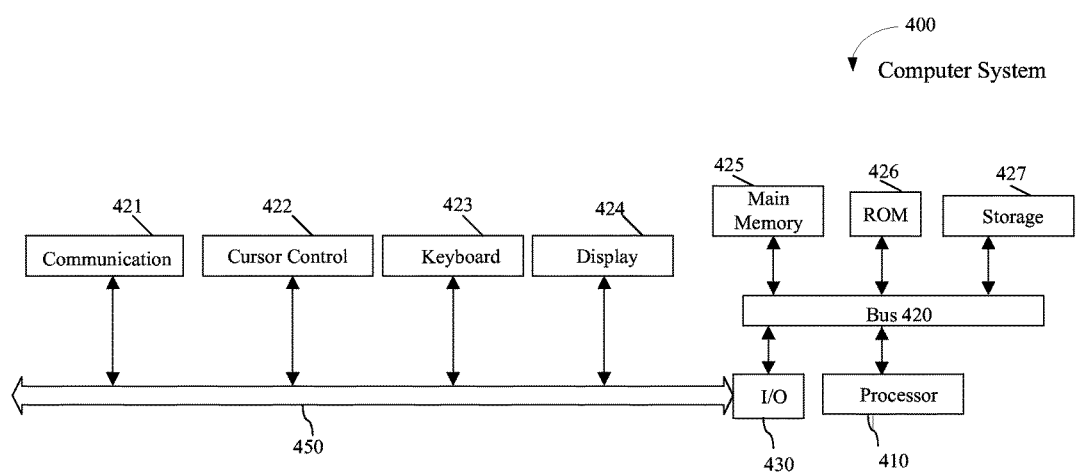
FIG. 4 illustrates one embodiment of a computer system.

FIG. 4 illustrates a computer system 400 on which printing system 100 may be implemented. Computer system 400 includes a system bus 420 for communicating information, and a processor 410 coupled to bus 420 for processing information.

Computer system 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Computer system 400 also may include a read only memory (ROM) and or other static storage device 426 coupled to bus 420 for storing static information and instructions used by processor 410.

A data storage device 425 such as a magnetic disk or optical disc and its corresponding drive may also be coupled to computer system 400 for storing information and instructions. Computer system 400 can also be coupled to a second I/O bus 550 via an I/O interface 430. A plurality of I/O devices may be coupled to I/O bus 450, including a display device 424, an input device (e.g., an alphanumeric input device 423 and or a cursor control device 422). The communication device 421 is for accessing other computers (servers or clients). The communication device 421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A non-transitory machine-readable medium including data that, when accessed by a machine, cause the machine to perform operations comprising:
   performing a preflight to collect paper properties from a print job data stream;
   receiving a request for paper properties needed to perform page raster image processing (RIP) of a page of the print job data stream;
   prompting an operator to load a virtual paper without inserting a physical medium upon a determination that the paper properties have not previously been saved, wherein loading the virtual paper comprises selecting virtual paper properties that includes paper properties collected during the preflight; and
   performing the RIP of the page; and
   transmitting the page to be printed.

2. The machine readable of claim 1 including data that, when accessed by the machine, further cause the machine to perform operations comprising determining that the RIP of the page is not in a print path upon a determination that the paper properties have not previously been saved.

3. The machine readable of claim 1 wherein the paper properties are received upon the virtual paper being loaded via a graphical user interface (GUI).

4. The machine readable of claim 1 wherein the paper properties are received upon the detecting adjustments to one or more profiles, via a graphical user interface (GUI), collected during the preflight.

5. The machine readable of claim 1 including data that, when accessed by the machine, further cause the machine to perform operations comprising saving the paper properties for RIP of a subsequent page.

6. The machine readable of claim 5 including data that, when accessed by the machine, further cause the machine to perform operations comprising transmitting the paper properties for performance of a RIP.

7. The machine readable of claim 1 including data that, when accessed by the machine, further cause the machine to perform operations comprising:
   determining that the RIP of the page is within print path after receiving the request for paper properties; and
   delaying timing of obtaining the paper properties for the page.

8. The machine readable of claim 7 wherein the paper properties are obtained upon paper being loaded for printing at a print engine.

9. The machine readable of claim 8 wherein the paper properties are obtained from tray sensor measurements of the loaded paper.

10. The machine readable of claim 9 including data that, when accessed by the machine, further cause the machine to perform operations comprising saving the paper properties for RIP of a subsequent page.

11. A printing system comprising:
   a print job manager to perform a preflight to collect paper properties from a print job data stream, receive a request for paper properties needed to perform page raster image processing (RIP) of a page of the print job data stream, prompt an operator to load a virtual paper without inserting a physical medium upon a determination that the paper properties have not previously been saved and receive paper properties for the page entered by the operator, perform the RIP of the page and transmit the page to be printed, wherein loading the virtual paper comprises selecting virtual paper properties that includes paper properties collected during the preflight.

12. The printing system of claim 11 wherein the print job manager further determines that the RIP of the page is not in a print path upon a determination that the paper properties have not previously been saved.

13. The printing system of claim 11 further comprises a graphical user interface (GUI) to enter the virtual paper.

14. The printing system of claim 11 further comprises a graphical user interface (GUI) to list one or more profiles collected during the preflight and detect adjustments to the profiles.

15. The printing system of claim 11 further comprising a storage medium to save the paper properties for RIP of a subsequent page.

16. The printing system of claim 15 further comprising a raster image processor to receive the paper properties and to perform the RIP.

17. The printing system of claim 11 wherein the print job manager determines that the RIP of the page is within print path after receiving the request for paper properties and delay timing of obtaining the paper properties for the page.

18. The printing system of claim 17 wherein the paper properties are obtained upon paper being loaded for printing at a print engine.

19. The printing system of claim 18 wherein the paper properties are obtained from tray sensor measurements of the loaded paper.

20. The printing system of claim 19 wherein the print job manager saves the paper properties for RIP of a subsequent page.

* * * * *